(12) United States Patent
King et al.

(10) Patent No.: US 8,421,271 B2
(45) Date of Patent: Apr. 16, 2013

(54) APPARATUS FOR TRANSFERRING ENERGY USING ONBOARD POWER ELECTRONICS AND METHOD OF MANUFACTURING SAME

(75) Inventors: Robert Dean King, Schenectady, NY (US); Robert Louis Steigerwald, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 706 days.

(21) Appl. No.: 12/550,536

(22) Filed: Aug. 31, 2009

(65) Prior Publication Data

US 2011/0050174 A1 Mar. 3, 2011

(51) Int. Cl.
*H02J 1/00* (2006.01)
*H02J 3/00* (2006.01)

(52) U.S. Cl.
USPC .......................................................... 307/82

(58) Field of Classification Search ...................... 307/82
See application file for complete search history.

(56) References Cited

U.S. PATENT DOCUMENTS

| | | |
|---|---|---|
| 5,373,195 A | 12/1994 | De Doncker et al. |
| 5,589,743 A | 12/1996 | King |
| 5,903,449 A | 5/1999 | Garrigan et al. |
| 6,118,678 A | 9/2000 | Limpaecher et al. |
| 6,331,365 B1 | 12/2001 | King |
| 6,737,822 B2 | 5/2004 | King |
| 7,049,792 B2 | 5/2006 | King |
| 7,499,296 B2 | 3/2009 | Baudesson et al. |
| 7,595,597 B2 | 9/2009 | King et al. |
| 7,750,501 B2 | 7/2010 | Huang |
| 7,960,865 B2 * | 6/2011 | Jahkonen ......................... 307/82 |
| 2002/0051368 A1 | 5/2002 | Ulinski et al. |
| 2007/0012492 A1 | 1/2007 | Deng et al. |

* cited by examiner

*Primary Examiner* — Hal Kaplan
(74) *Attorney, Agent, or Firm* — Ziolkowski Patent Solutions Group, SC; Jean K. Testa

(57) ABSTRACT

An apparatus includes an energy storage device, a bi-directional DC-to-DC voltage converter coupled to the energy storage device, and an input device. A voltage bus is coupled to the bi-directional DC-to-DC voltage converter and to the input device. The apparatus also includes a controller configured to control the bi-directional DC-to-DC voltage converter to convert a charging energy on the voltage bus into a charging energy suitable for charging the energy storage device during a charging operation and to monitor a voltage of the energy storage device during the charging operation. The controller is also configured to control the bi-directional DC-to-DC voltage converter to convert the charging energy into a charging energy configured to maintain the voltage of the energy storage device at a pre-determined value.

22 Claims, 2 Drawing Sheets

APPARATUS FOR TRANSFERRING ENERGY USING ONBOARD POWER ELECTRONICS AND METHOD OF MANUFACTURING SAME

BACKGROUND OF THE INVENTION

Embodiments of the invention relate generally to electric drive systems including hybrid and electric vehicles and to stationary drives that are subject to transient or pulsed loads and, more particularly, to transferring energy between an electrical storage device of the vehicle or drive and a power source external to the vehicle or drive.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to re-charge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the re-charging of the traction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source.

BRIEF DESCRIPTION OF THE INVENTION

According to one aspect of the invention, an apparatus comprises an energy storage device configured to supply electrical energy, a first bi-directional DC-to-DC voltage converter coupled to the energy storage device, and a first input device configured to receive electrical energy from a first external energy source. A voltage bus is coupled to the first bi-directional DC-to-DC voltage converter and to the first input device, and a voltage inverter is coupled to the voltage bus and configured to convert a voltage on the voltage bus that is supplied by the energy storage device and the first bi-directional DC-to-DC voltage converter into an AC voltage suitable for driving an electromechanical device. The apparatus comprises a controller configured to control the first bi-directional DC-to-DC voltage converter to convert a first charging energy on the voltage bus into a second charging energy suitable for charging the energy storage device during a charging operation and to monitor a voltage of the energy storage device during the charging operation. The controller is also configured to control the first bi-directional DC-to-DC voltage converter to convert the first charging energy into a third charging energy configured to maintain the voltage of the energy storage device at a pre-determined value.

In accordance with another aspect of the invention, a method of manufacturing includes providing a first energy storage device, coupling a first bi-directional buck/boost converter to the first energy storage device, and coupling a voltage bus to the first bi-directional buck/boost converter. The method also includes coupling a voltage inverter to the voltage bus and configuring the voltage inverter to convert a voltage on the voltage bus supplied by the first energy storage device and the first bi-directional buck/boost converter into an AC voltage suitable for driving an electromechanical device. The method further includes coupling a first connector to the voltage bus, the connector configured to receive electrical energy from a first external energy source and configuring a controller to cause the first bi-directional buck/boost converter to convert a first charging energy on the voltage bus into a second charging energy suitable for charging the first energy storage device during a charging operation. The controller is also configured to monitor a voltage of the first energy storage device during the charging operation, and cause the first bi-directional DC-to-DC voltage converter to convert the first charging energy into a third charging energy configured to maintain the voltage of the first energy storage device at a pre-determined value.

In accordance with yet another aspect of the invention, a system comprises a charge bus configured to receive charging energy from a voltage source external to the system, a connector coupled to the charge bus and configured to transfer the charging energy from the voltage source to the charge bus, and a voltage inverter coupled to the charge bus. The system also comprises an energy storage device configured to output a DC voltage and a bi-directional voltage converter coupled between the charge bus and the energy storage device and configured charge the energy storage device via conversion of a voltage on the voltage bus during a charging operation. A controller is included and is configured to monitor a transfer of the charging energy supplied to the energy storage device during the charging operation and to control the bi-directional voltage converter to modify a current supplied to the energy storage device after the monitored transfer of the charging energy has crossed a threshold.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
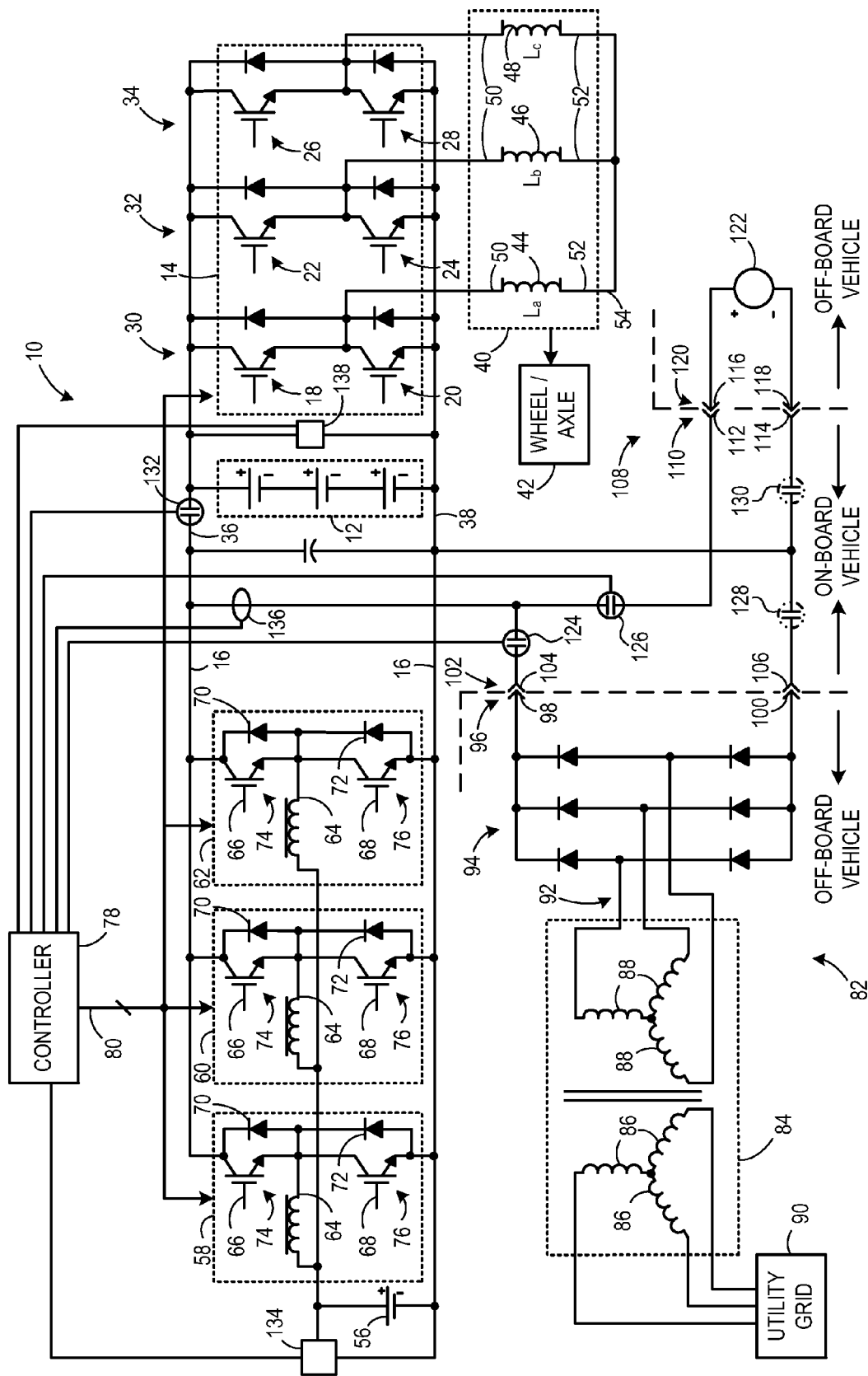
FIG. 1 is a schematic diagram of a traction system according to an embodiment of the invention.

FIG. 1 is a schematic diagram of a traction system 10 according to an embodiment of the invention. Traction system 10 includes a first energy storage device 12. In one embodiment, first energy storage device 12 is a high-voltage energy storage device and may be a battery, a flywheel system, fuel cell, an ultracapacitor, or the like. First energy storage device 12 is coupled to a bi-directional voltage modification assembly 14 via a DC bus 16. In one embodiment, bi-directional voltage modification assembly 14 is a bi-directional DC-to-AC voltage inverter. Bi-directional DC-to-AC voltage inverter 14 includes six half phase modules 18, 20, 22, 24, 26, and 28 that are paired to form three phases 30, 32, and 34. Each phase 30, 32, 34 is coupled to a pair of conductors 36, 38 of DC bus 16. An electromechanical device or motor 40 is coupled to bi-directional DC-to-AC voltage inverter 14. In one embodiment, electromechanical device 40 is a traction motor mechanically coupled to one or more driving wheels or axles 42 of a vehicle (not shown) or other electrical apparatus including cranes, elevators, or lifts. Electromechanical device 40 includes a plurality of windings 44, 46, and 48 having a plurality of conductors 50 coupled to respective phases 30, 32, 34 of bi-directional DC-to-AC voltage inverter 14. Windings 44-48 also have a plurality of conductors 52 coupled together to form a node 54.

Traction system 10 includes a second energy storage device 56 coupled to DC bus 16 to provide power to drive wheels 42. In one embodiment, second energy storage device 56 is a low-voltage energy storage device and may be a battery, a fuel cell, an ultracapacitor, or the like. First energy storage device 12 may be configured to provide a higher power than second energy storage device 56 to provide power during, for example, acceleration periods of the vehicle. Second energy storage device 56 may be configured to provide a higher energy than first energy storage device 12 to provide a longer-lasting power to the vehicle to increase a travelling distance thereof.

Figure 2:
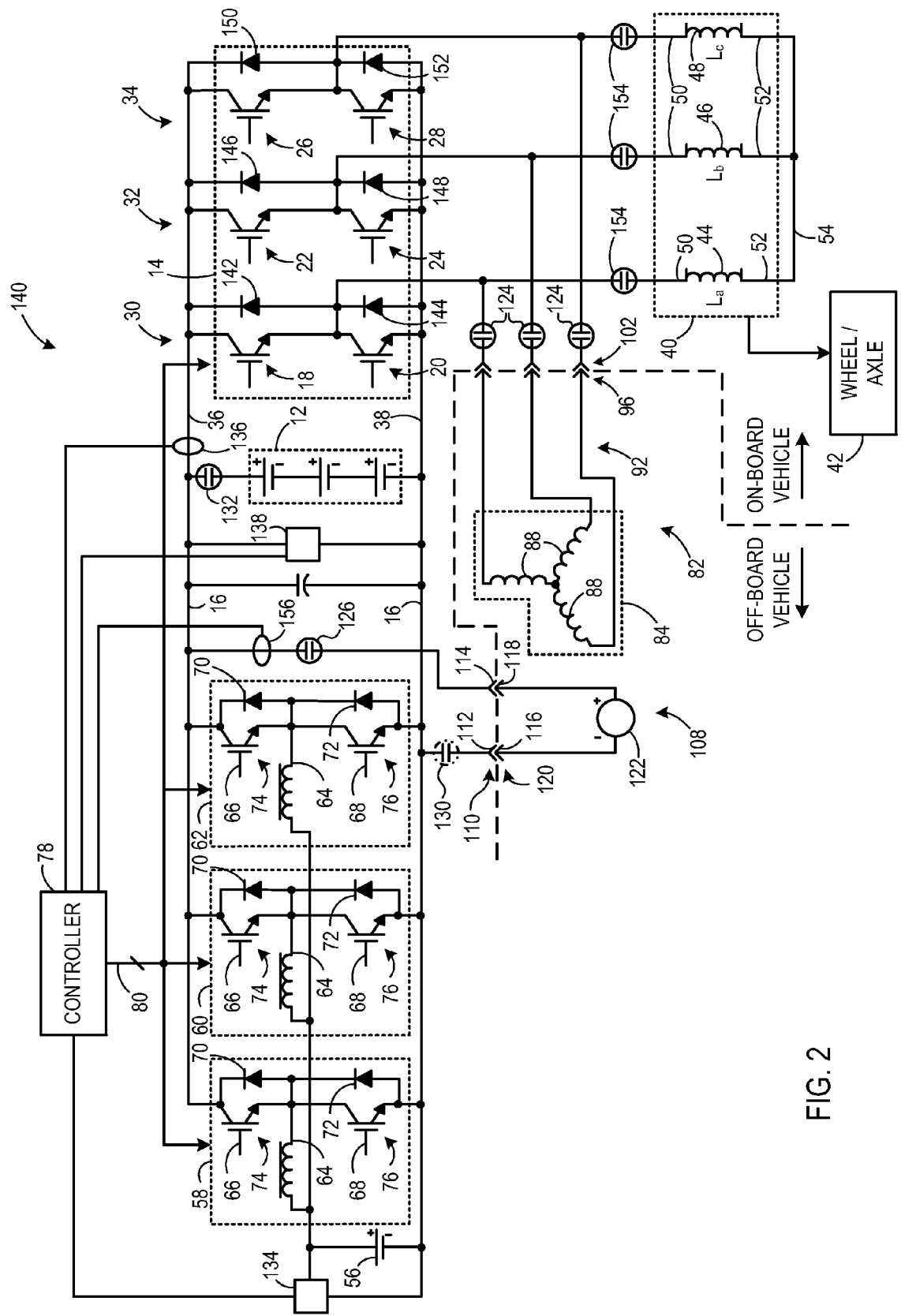
FIG. 2 is a schematic diagram of another traction system according to an embodiment of the invention.

A plurality of bi-directional DC-to-DC voltage converters 58, 60, 62 are coupled to second energy storage device 56 and to DC bus 16 and are configured to convert one DC voltage into another DC voltage. In one embodiment, each bi-directional DC-to-DC voltage converter 58-62 is a bi-directional buck/boost converter and includes an inductor 64 coupled to a pair of switches 66, 68 and coupled to a pair of diodes 70, 72. Each switch 66, 68 is coupled to a respective diode 70, 72, and each switch/diode pair forms a respective half phase module 74, 76. Switches 66, 68 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs). While FIGS. 1 and 2 show three bi-directional DC-to-DC voltage converters, embodiments of the invention may include more or less than three bi-directional DC-to-DC voltage converters.

Traction system 10 includes a controller 78 coupled to bi-directional DC-to-DC voltage converters 58-62 via lines 80, and energy supplied via second energy storage device 56 is boosted by control of switches 66, 68 of bi-directional DC-to-DC voltage converters 58-62 to supply the higher voltage to DC bus 16. Controller 78 is also coupled to half phase modules 18-28 via lines 80. Controller 78, through appropriate control of half phase modules 18-28, is configured to control bi-directional DC-to-AC voltage inverter 14 to convert a DC voltage or current on DC bus 16 to an AC voltage or current for supply to windings 44-48 via conductors 50. Accordingly, the DC voltage or current from first or second energy storage devices 12, 56, or combination of first and second energy storage devices 12, 56 may be converted into an AC voltage or current and delivered to motor 40 to drive wheels 42. In other non-vehicle propulsion systems, the drive wheels 42 may be another type of load (not shown), including a pump, fan, winch, crane, or other motor driven loads. In a regenerative braking mode, electromechanical device 40 may be operated as a generator to brake the wheels 42 and to supply AC voltage or current to bi-directional DC-to-AC voltage inverter 14 for inversion into a DC voltage or current onto DC bus 16 that is suitable for re-charging first energy storage device 12 or second energy storage device 56.

When a vehicle or apparatus incorporating traction system 10 is parked or not in use, it may be desirable to plug the vehicle into, for example, the utility grid or to a renewable energy source to refresh or re-charge energy storage device 56. Accordingly, FIG. 1 shows an embodiment of the invention including a charging system 82 coupled to traction system 10 for the re-charging of energy storage device 56 such that components of traction system 10 may be used for the dual purposes of re-charging energy storage device 56 and converting energy from energy storage devices 56 into energy usable to drive the load or propel the vehicle.

Charging system 82 includes an external voltage source 84 having a plurality of primary windings 86 coupled to a plurality of secondary windings 88. Primary windings 86 may be coupled to the utility grid 90. While external voltage source 84 is shown as a poly-phase utility system in FIGS. 1 and 2 having three phases, it is contemplated that the external poly-phase source could instead have one, two, six, or any other number of phases. In addition, it is not necessary that the number of phases of external voltage source 84 matches the number of bi-directional DC-to-DC voltage converters 58-62. A plurality of conductors 92 couple secondary windings 88 to a rectifier 94, which is coupled to a connector or plug 96 having contacts 98, 100. While external voltage source 84 is shown as a three-phase utility system in FIGS. 1-2, it is contemplated that external, source 84 could be a single-phase or two-phase voltage source. Plug 96 is configured to mate with a connector or plug 102 of traction system 10 having contacts 104, 106. Plug 102 is coupled across DC bus 16.

FIG. 1 also shows another charging system 108 coupled to traction system 10 for the re-charging of energy storage device 56. Charging system 108 includes a connector or plug 110 of traction system 10 having a pair of contacts 112, 114 configured to mate with a pair of contacts 116, 118 of a connector or plug 120 of an alternative DC source 122. Alternative DC source 122 may be, for example, a solar energy device, a rectified or DC output of a wind turbine, a powered third rail of a rail system, or the like. A pair of switches or contactors 124, 126 may be coupled to controller 78 and to respective plugs 102 and 110 such that controller 78 may de-couple plug 102 from traction system 10 when alternative DC source 122 is coupled to traction system 10 or de-couple plug 110 from traction system 10 when voltage source 84 is coupled to traction system 10. In this manner, controller 78 allows either voltage source 84 or alternative DC source 122 to override the other when both are coupled to plugs 102, 110. In this manner, a direct connection between voltage source 84 and alternative DC source 122 may be avoided. In addition, controller 78 may control switches 124, 126 to prevent energy transfer between voltage source 84 or alternative DC source 122 and DC bus 16 when re-charging is either terminated or not desired, such as when second energy storage device 56 is not in a condition to be re-charged. In one embodiment, the placement and/or configuration of plugs 102, 110 prevents simultaneous attachment thereto by plugs 96, 120. In another embodiment, plugs 102, 110 are the same plug configured to accept either plug 96 or plug 120. In addition, contactors 124, 126 may be controlled to their open states to prevent voltage from DC bus 16 to be present across either plug 102 or plug 110 while the respective plugs 102, 110 are being physically being coupled to respective plugs 96, 120. A set of switches or contactors 128, 130 (shown in phantom) may be coupled to the negative sides of rectifier 94 and alternative DC source 122 and may also be controlled by controller 78 to their open states to further prevent voltage from DC bus 16 appearing at plugs 102 and 110 while being connected to respective plugs 96, 120.

In a re-charging operation, a switch or contactor 132 coupled to conductor 36 is opened via controller 78 to de-couple first energy storage device 12 from charge bus 16 during the re-charging operation. When plugs 96, 102 or plugs 110, 120 are coupled together, controller 78 causes contactor 132 to open, thus de-coupling first energy storage device 12 from DC bus 16 such that energy from voltage source 84 or alternative DC source 122 is not coupled directly across the terminals of first energy storage device 12.

In the re-charging operation, charging energy is delivered by current from voltage source 84 through rectifier 94 or from alternative source 122 to charge bus 16. In one embodiment, second energy storage device 56 has an instantaneous acceptance capability that is smaller than an instantaneous delivery capability of voltage source 84 or alternative source 122. Controller 78 actively controls bi-directional DC-to-DC voltage converters 58-62 to buck the voltage of the charging energy supplied to charge bus 16 such that second energy storage device 56 may be re-charged at a controlled and regulated pace to a desired voltage re-charge level. In one embodiment, controller 78 controls bi-directional DC-to-DC voltage converters 58-62 in parallel to maximize the charging energy supplied to second energy storage device 56. Controller 78 monitors the voltage of second energy storage device 56 via a voltage sensor 134. When the monitored voltage reaches or crosses a voltage threshold value, controller 78 controls bi-directional converters 58-62 to maintain the voltage of second energy storage device 56 (such as at its "float voltage") while tapering the re-charging current to low levels. In this manner, the energy stored in second energy storage device 56 may be "topped off" or maintained at a desired final value. Controller 78 is configured to monitor the re-charging current via a current sensor 136. The threshold value may be based on a design and a temperature of second energy storage device 56.

In one embodiment, once second energy storage device 56 is re-charged, energy storage device 12 could then be charged directly from energy storage device 56 (which typically has significantly more energy than energy storage device 12) through bidirectional converters 58, 60, and 62 operating in boost mode. Bi-directional converters 58, 60, and 62 can be operated with their switching phases shifted (i.e., interleaved) so as to reduce voltage and current ripple levels in both energy storage devices. Furthermore, a voltage sensor 138 coupled to controller 78 allows controller 78 to monitor the voltage of first energy storage device 12 during its re-charging.

FIG. 2 shows a schematic diagram of a traction system 140 according to another embodiment of the invention. Elements and components common to traction system 10 will be discussed relative to the same reference numbers as appropriate.

As shown in FIG. 2, voltage source 84 is coupled to bi-directional DC-to-AC voltage inverter 14. However, unlike that shown in FIG. 1, plug 102 is coupled to bi-directional DC-to-AC voltage inverter 14 between windings 44-48 of electromechanical device or motor 40 and a plurality of diodes 142, 144, 146, 148, 150, 152 of bi-directional voltage modification assembly 14. A plurality of switches or contactors 154 is coupled to windings 44, 46, and 48 such that, during a re-charging operation when charging system 82 is coupled to traction system 140, motor 40 may be de-coupled therefrom so that the charging energy does not cause the vehicle to move during charging.

In this embodiment, charging system 82 does not have a separate rectifier such as rectifier 94 shown in FIG. 1. Instead, diodes 142-152 provide the rectification to convert the AC power supplied via voltage source 84 to DC power for charge bus 16. In this embodiment, all diodes 142-152 are rated to allow current from the charging energy on voltage source 84 to flow directly onto charge bus 16.

In a re-charging operation, switch 132 is opened and charging energy flows from voltage source 84 through diodes 142-152 or from alternative source 122 to charge bus 16. Controller 78 actively controls bi-directional DC-to-DC voltage converters 58-62 to buck the voltage of the charging energy supplied to charge bus 16 such that second energy storage device 56 may be more re-charged at a controlled and regulated pace to a desired voltage re-charge level.

As described above with respect to FIG. 1, in one embodiment, controller 78 controls bi-directional DC-to-DC voltage converters 58-62 in parallel to maximize the charging energy supplied to second energy storage device 56. Controller 78 monitors the voltage of second energy storage device 56 via voltage sensor 134. When the monitored voltage of second energy storage device 56 reaches or crosses a voltage threshold value, the voltage of second energy storage device 56 can be maintained at the "float" or desired voltage by the bidirectional converters 58-62, and the current of the charging energy may be reduced by controller 78 through the monitoring of the current of the charging energy via current sensor 136 when the charging energy is being supplied by charging system 82 or via a current sensor 156 when the charging energy is being supplied by alternative source 122. In one embodiment, the threshold value is based on a design and a temperature of second energy storage device 56. Once re-charged, second energy storage device 56 may re-charge first energy storage device 12 through bidirectional converters 58, 60, and 62 operating in boost mode as described above while switch 132 is closed.

As illustrated in FIG. 1, either the rectified external AC voltage source 82 or the external DC source 122 can be directly coupled to charge bus 16 through respective contactors 124,128 and 126,130. As illustrated in FIG. 2 in an embodiment of the invention, with contactors 126, 130 open and with contactors 124 closed, only external AC source 84 is coupled to charge bus 16 through the DC-AC inverter 14. While switch 132 is closed, controller 78 is able to operate bi-directional DC-to-AC voltage inverter 14 in a regenerative or a Pulse Width Modulated (PWM) mode to control the voltage on DC bus 16 to a voltage, as measured by voltage sensor 138, thereby to perform a recharge of energy storage device 12 and to also control bi-directional DC-to-DC voltage converters 58-62 to a voltage level, as measured by voltage sensor 134, thereby having the capability to charge both energy storage devices 12 and 56 simultaneously.

Embodiments of the invention thus use inverters and machine inductances already on-board a traction control system to re-charge one or more energy storage devices of the traction control system. In this manner, the inverters and machines may be used for the dual purposes of motoring and re-charging the energy storage devices. Using the inverters and machine inductances on-board the vehicles allows for off-board charging stations to have a simple, low cost, high-power design. In addition, a high-current charging may be obtained in a cost effective manner.

A technical contribution for the disclosed apparatus is that it provides for a controller implemented technique for transferring energy using onboard power electronics.

According to one embodiment of the invention, an apparatus comprises an energy storage device configured to supply electrical energy, a first bi-directional DC-to-DC voltage converter coupled to the energy storage device, and a first input device configured to receive electrical energy from a first external energy source. A voltage bus is coupled to the first bi-directional DC-to-DC voltage converter and to the first input device, and a voltage inverter is coupled to the voltage bus and configured to convert a voltage on the voltage bus that is supplied by the energy storage device and the first bi-directional DC-to-DC voltage converter into an AC voltage suitable for driving an electromechanical device. The apparatus comprises a controller configured to control the first bi-directional DC-to-DC voltage converter to convert a first charging energy on the voltage bus into a second charging energy suitable for charging the energy storage device during a charging operation and to monitor a voltage of the energy storage device during the charging operation. The controller is also configured to control the first bi-directional DC-to-DC voltage converter to convert the first charging energy into a third charging energy configured to maintain the voltage of the energy storage device at a pre-determined value.

In accordance with another embodiment of the invention, a method of manufacturing includes providing a first energy storage device, coupling a first bi-directional buck/boost converter to the first energy storage device, and coupling a voltage bus to the first bi-directional buck/boost converter. The method also includes coupling a voltage inverter to the voltage bus and configuring the voltage inverter to convert a voltage on the voltage bus supplied by the first energy storage device and the first bi-directional buck/boost converter into an AC voltage suitable for driving an electromechanical device. The method further includes coupling a first connector to the voltage bus, the connector configured to receive electrical energy from a first external energy source and configuring a controller to cause the first bi-directional buck/boost converter to convert a first charging energy on the voltage bus into a second charging energy suitable for charging the first energy storage device during a charging operation. The controller is also configured to monitor a voltage of the first energy storage device during the charging operation, and cause the first bi-directional DC-to-DC voltage converter to convert the first charging energy into a third charging energy configured to maintain the voltage of the first energy storage device at a pre-determined value.

In accordance with yet another embodiment of the invention, a system comprises a charge bus configured to receive charging energy from a voltage source external to the system, a connector coupled to the charge bus and configured to transfer the charging energy from the voltage source to the charge bus, and a voltage inverter coupled to the charge bus. The system also comprises an energy storage device configured to output a DC voltage and a bi-directional voltage converter coupled between the charge bus and the energy storage device and configured charge the energy storage device via conversion of a voltage on the voltage bus during a charging operation. A controller is included and is configured to monitor a transfer of the charging energy supplied to the energy storage device during the charging operation and to control the bidirectional voltage converter to modify a current supplied to the energy storage device after the monitored transfer of the charging energy has crossed a threshold.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
    an energy storage device configured to supply electrical energy;
    a first bi-directional DC-to-DC voltage converter coupled to the energy storage device;
    a first input device configured to receive electrical energy from a first external energy source;
    a voltage bus coupled to the first bi-directional DC-to-DC voltage converter and to the first input device;
    a voltage inverter coupled to the voltage bus and configured to convert a voltage on the voltage bus that is supplied by the energy storage device and the first bi-directional DC-to-DC voltage converter into an AC voltage suitable for driving an electromechanical device; and
    a controller configured to:
        control the first bi-directional DC-to-DC voltage converter to convert a first charging energy on the voltage bus into a second charging energy suitable for charging the energy storage device during a charging operation;
        monitor a voltage of the energy storage device during the charging operation; and
        control the first bi-directional DC-to-DC voltage converter to convert the first charging energy into a third charging energy configured to maintain the voltage of the energy storage device at a pre-determined value.

2. The apparatus of claim 1 further comprising a first switch configured to couple a conductor of the first input device directly to the voltage bus.

3. The apparatus of claim 2 wherein the controller is further configured to operate the first switch to couple the conductor of the first input device directly to the voltage bus and to de-couple the conductor of the first input device from the voltage bus.

4. The apparatus of claim 3 further comprising a plurality of bi-directional DC-to-DC voltage converters comprising the first bi-directional DC-to-DC voltage converter, and wherein the controller is further configured to control the plurality of bi-directional DC-to-DC voltage converters in a parallel mode to convert a first charging energy on the voltage bus into a second charging energy suitable for charging the energy storage device during a charging operation.

5. The apparatus of claim 2 wherein the first input device is configured to receive electrical energy from a third rail of a rail system.

6. The apparatus of claim 1 further comprising a second input device coupled to the voltage bus, the second input device configured to receive electrical energy from a second external energy source.

7. The apparatus of claim 6 wherein the second input device is coupleable to the voltage bus via the voltage inverter.

8. The apparatus of claim 7 wherein the second input device is configured to receive an AC voltage, and wherein the voltage inverter is configured to rectify the AC voltage into a DC voltage and to supply the DC voltage to the voltage bus.

9. The apparatus of claim 1 wherein the energy storage device is a low-voltage energy storage device and further comprising a high-voltage energy storage device coupled to the voltage bus, and wherein the controller is further configured to control the first bi-directional DC-to-DC voltage converter to convert a first voltage from the low-voltage energy storage device into a second voltage suitable for charging the high-voltage energy storage device.

10. The apparatus of claim 9 wherein the high-voltage energy storage device comprises one of a battery, a flywheel system, and an ultracapacitor.

11. The apparatus of claim 1 wherein the energy storage device is a low-voltage energy storage device and further comprising a high-voltage energy storage device coupled to the voltage bus, and wherein the controller is further configured to control the voltage inverter and the first bi-directional DC-to-DC voltage converter simultaneously to charge the low-voltage and high-voltage energy storage devices.

12. The apparatus of claim 1 wherein the controller, in being configured to control the first bi-directional DC-to-DC voltage converter to convert the first charging energy on the voltage bus into the second charging energy, is configured to buck a voltage of the first charging energy to a voltage of the second charging energy.

13. The apparatus of claim 1 further comprising the electromechanical device, wherein the electromechanical device is configured to operate one of a vehicle, a crane, an elevator, and a lift.

14. The apparatus of claim 1 wherein the energy storage device comprises one of a battery, a fuel cell, and an ultracapacitor.

15. A method of manufacturing comprising:
providing a first energy storage device;
coupling a first bi-directional buck/boost converter to the first energy storage device;
coupling a voltage bus to the first bi-directional buck/boost converter;
coupling a voltage inverter to the voltage bus and configuring the voltage inverter to convert a voltage on the voltage bus supplied by the first energy storage device and the first bi-directional buck/boost converter into an AC voltage suitable for driving an electromechanical device;
coupling a first connector to the voltage bus, the connector configured to receive electrical energy from a first external energy source; and
configuring a controller to:
cause the first bi-directional buck/boost converter to convert a first charging energy on the voltage bus into a second charging energy suitable for charging the first energy storage device during a charging operation;
monitor a voltage of the first energy storage device during the charging operation; and
cause the first bi-directional DC-to-DC voltage converter to convert the first charging energy into a third charging energy configured to maintain the voltage of the first energy storage device at a pre-determined value.

16. The method of manufacturing of claim 15 further comprising:
coupling a second bi-directional buck/boost converter to the first energy storage device and to the voltage bus; and
configuring the controller to cause the first and second bi-directional buck/boost converters to convert the first charging energy on the voltage bus into the second charging energy suitable for charging the first energy storage device in parallel during the charging operation.

17. The method of manufacturing of claim 15 further comprising:
coupling a contactor between the voltage bus and a conductor of the first connector; and
configuring the controller to couple the conductor of the first connector directly to the voltage bus during the charging operation.

18. The method of manufacturing of claim 17 wherein configuring the controller to couple the conductor of the first connector directly to the voltage bus during the charging operation comprises configuring the controller to couple charging energy directly to the voltage bus during the charging operation from a third rail coupled to the conductor of the first connector.

19. The method of manufacturing of claim 18 wherein configuring the controller to couple the conductor of the first connector directly to the voltage bus during the charging operation comprises configuring the controller to couple charging energy directly to the voltage bus during the charging operation from a transformer coupled to a utility grid and coupled to the conductor of the first connector.

20. A system comprising:
a charge bus configured to receive charging energy from a voltage source external to the system;
a connector coupled to the charge bus and configured to transfer the charging energy from the voltage source to the charge bus;
a voltage inverter coupled to the charge bus;
an energy storage device configured to output a DC voltage;
a bi-directional voltage converter coupled between the charge bus and the energy storage device and configured to charge the energy storage device via conversion of a voltage on the voltage bus during a charging operation; and
a controller configured to:
monitor a transfer of the charging energy supplied to the energy storage device during the charging operation; and
control the bi-directional voltage converter to modify a current supplied to the energy storage device after the monitored transfer of the charging energy has crossed a threshold.

21. The system of claim 20 further comprising a plurality of bi-directional voltage converters, and wherein the controller is further configured to control each bi-directional voltage converter in parallel with each other during the charging operation.

22. The system of claim 20 further comprising a motor, and wherein the controller is further configured to control the bi-directional voltage converter and the voltage inverter to modify energy from the energy storage device to drive the motor.

* * * * *